United States Patent [19]
Eda et al.

[11] Patent Number: 5,760,820
[45] Date of Patent: Jun. 2, 1998

[54] DIGITAL SIGNAL TRANSMISSION SYSTEM WITH PRIORITY INFORMATION FORCING DISPLAY OF TEXT ON A RECEIVER

[75] Inventors: Takanori Eda; Isao Nakagawa, both of Yokohama; Keiro Shinkawa, Hiratsuka; Tsutomu Noda, Yokohama; Toshio Nagashima, Yokohama; Kenji Katsumata, Yokohama; Satoshi Iimuro, Yokohama, all of Japan

[73] Assignee: Hitachi, Ltd., Tokyo, Japan

[21] Appl. No.: 598,006

[22] Filed: Feb. 7, 1996

[30] Foreign Application Priority Data

Feb. 10, 1995 [JP] Japan ................................ 7-023142

[51] Int. Cl.⁶ .................................................. H04N 7/10
[52] U.S. Cl. ...................................... 348/9; 348/564
[58] Field of Search ............................. 348/9, 6, 13, 12, 348/10, 387, 553, 555, 558, 563, 564, 569, 468

[56] References Cited

U.S. PATENT DOCUMENTS

| 5,148,272 | 9/1992 | Acampora et al. | 358/133 |
|---|---|---|---|
| 5,231,494 | 7/1993 | Wachob | 348/385 |
| 5,260,778 | 11/1993 | Kaufman | 358/86 |
| 5,432,542 | 7/1995 | Thibadeau et al. | 348/6 |
| 5,485,221 | 1/1996 | Banker et al. | 348/563 |
| 5,495,283 | 2/1996 | Cowe | 348/9 |
| 5,497,187 | 3/1996 | Banker et al. | 348/6 |

FOREIGN PATENT DOCUMENTS

0239760B1  5/1991  European Pat. Off.

Primary Examiner—Victor R. Kostak
Attorney, Agent, or Firm—Antonelli, Terry, Stout & Kraus, LLP

[57] ABSTRACT

A digital signal transmission system including a transmitter and a receiver and capable of transmitting highly efficiently compressed/coded digital video signals and receiving the video signals so that the text of emergency information or the like can be displayed together with video images without once expanding/decoding the digital video signals on the transmitter side. In this system, the multiplexer of the transmitter multiplexes digital video signals and digital audio signals with a digital information signal of text which is produced and has N-level priority information added by the information stream generator, and transmits the multiplex signal to the receiver. The receiver determines whether the text of the digital information signal is to be displayed on the basis of the priority information added to the digital information signal, and when it is determined that the text are to be displayed, the receiver can display the text of the digital information signal together with the image of the digital video signal.

4 Claims, 14 Drawing Sheets

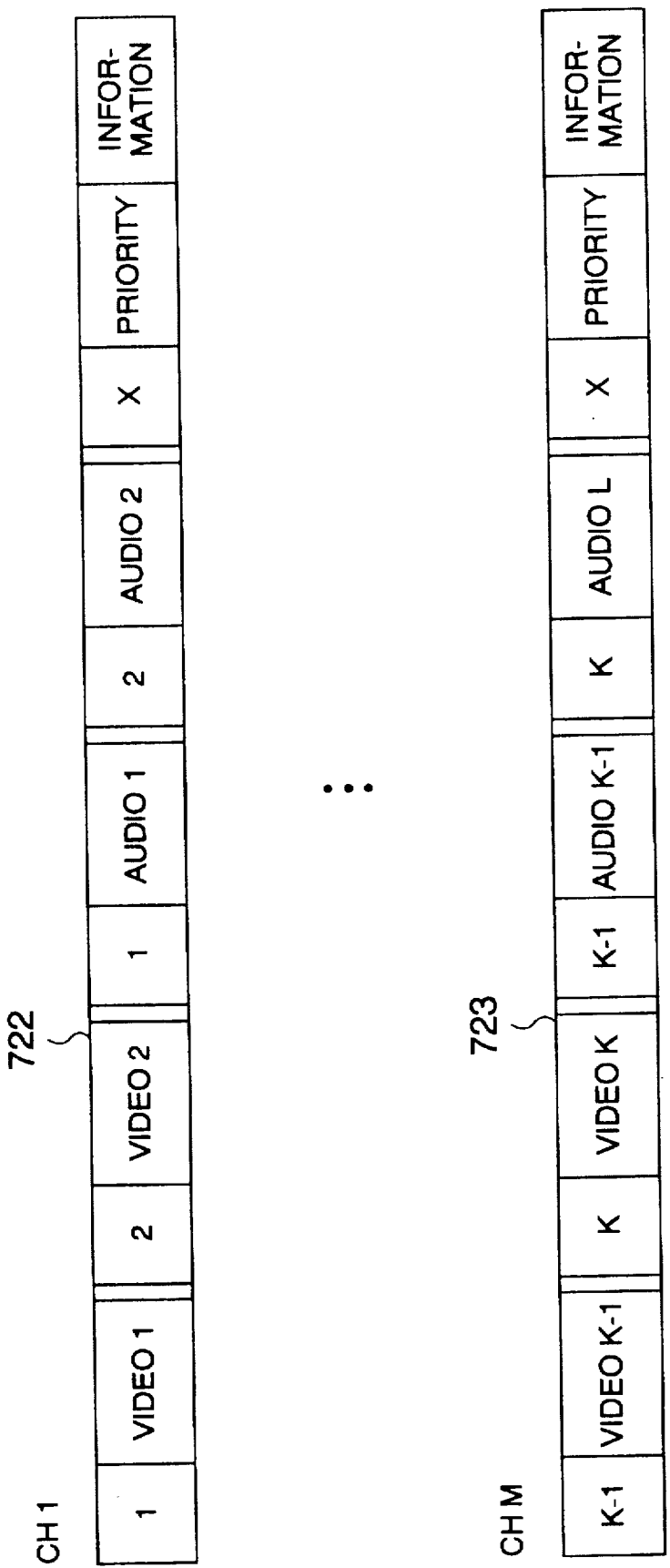

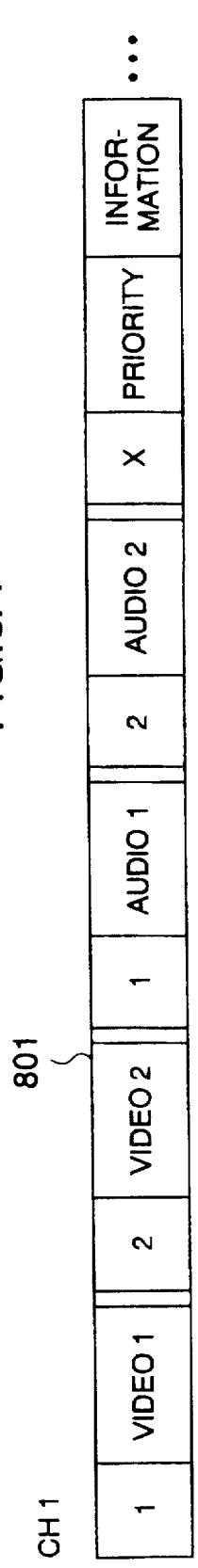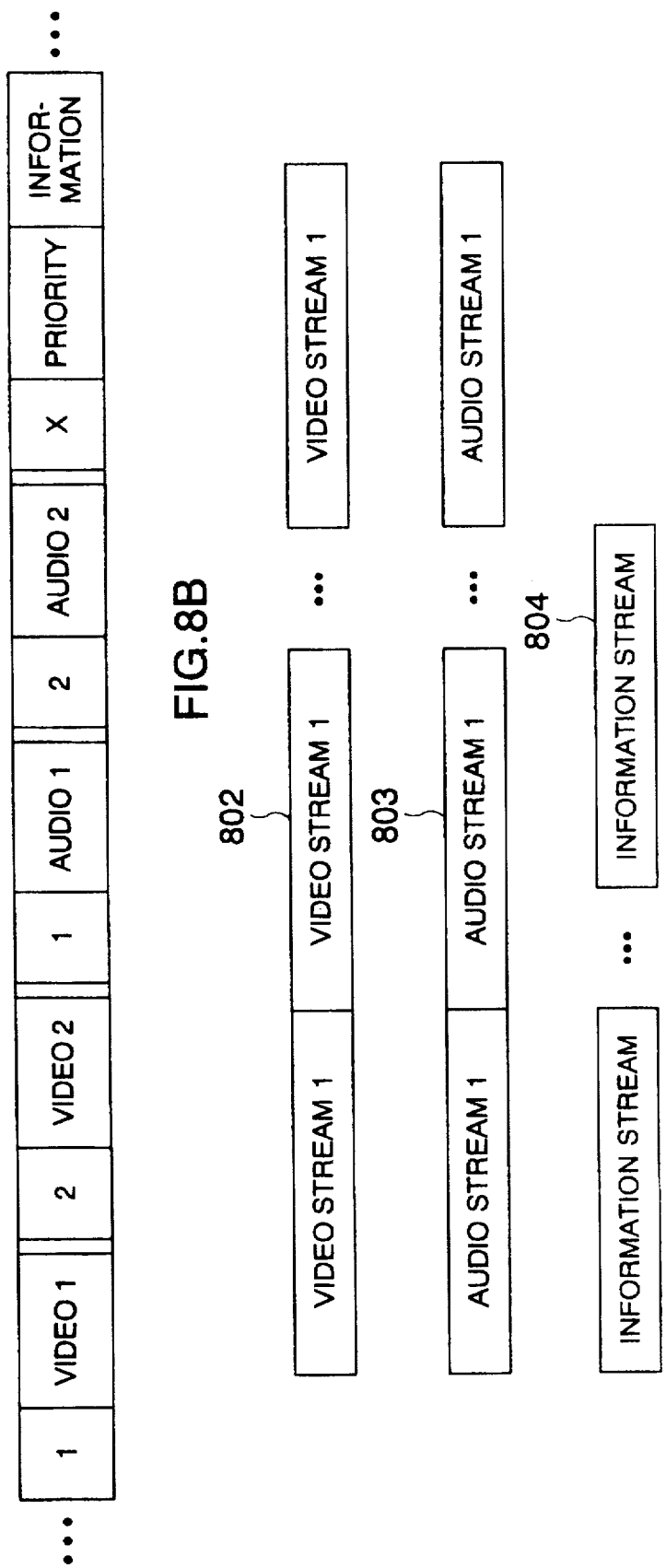
FIG.8A
FIG.8B

DIGITAL SIGNAL TRANSMISSION SYSTEM WITH PRIORITY INFORMATION FORCING DISPLAY OF TEXT ON A RECEIVER

BACKGROUND OF THE INVENTION

This invention relates to a digital signal transmission system and method for transmitting on a plurality of frequency channels a plurality of single bit streams which has digital signals multiplexed therein, and receiving the single bit streams transmitted on the channels.

In the United States, a large number of cable television (CATV) corporations and local telephone companies have announced bidirectional video service plans, and are making experiments on multi-channel service before the start of the bidirectional video service. Even in Japan, experimental facilities have been established for the purpose of the CATV bidirectional video service, and started making experiments on the multi-channel service.

FIG. 3 shows an example of the frequency bands for the CATV bidirectional video service.

Referring to FIG. 3, there are shown an upstream band 301 which is a transmission band for transmitting signals from the subscribers to the CATV station, an analog-system downstream band 302 which is a transmission band for transmitting signals from the CATV station to the subscribers, and a digital-system downstream band 303 for transmitting signals from the CATV station to the subscribers.

The analog-system downstream band 302 is used for a downstream channel in the existing CATV video service. Specifically, the analog-system downstream band 302 is used for a plurality of analog video signals of programs to be transmitted from the CATV station to the subscribers.

The digital-system upstream band 301 is used for an upstream channel for the CATV bidirectional video service, and the digital-system downstream band 303 is used for the CATV bidirectional video service. Specifically, the digital-system upstream band 301 is used for a digital control signal indicating a requested program or the like to be transmitted from the subscriber to the CATV station. The digital-system downstream band 303 is used for digital video signals corresponding to a plurality of programs to be transmitted from the CATV station to the subscribers. Since it is necessary to transmit a great variety of digital video signals requested by the subscribers, the digital-system downstream band 303 is a multi-channel service band in which the digital video signals as a plurality of programs are multiplexed to be transmitted on a single channel.

Since the analog-system downstream band 302 shown in FIG. 3 is narrow, it is possible to offer the CATV bidirectional video service by the transmission facilities used for the existing CATV video service.

FIG. 4 shows an example of the video multiplex transmission system for multiplexing a plurality of digital video signals.

Referring to FIG. 4, there are shown a transmitter 400, a receiver 407, monitors 408 and a transmission cable 415. The transmitter 400 includes a video server 401, a multiplexer 402, channel coders 403, digital modulators 404, radio-frequency (RF) converters 405 and a frequency multiplexer 406, and the receiver 407 includes a tuner 409, a digital demodulator 410, a waveform equalizer 411, a channel decoder 412, a demultiplexer 413 and a digital video expander such as an MPEG2 decoder.

In FIG. 4, the video server 401 has stored therein various different digital video signals which are obtained from software venders. These digital video signals are highly efficiently compressed/coded by, for example, MPEG2 technology.

In order that the digital video signals corresponding to a plurality of programs stored in the video server 401 can be assigned to and transmitted on one channel, the multiplexer 402 multiplexes the plurality of digital video signals to form single bit streams. The channel coders 403 add error correction codes to those single bit streams, and the digital modulators 404 digitally modulate the single bit streams from the channel coders. Then, the modulated streams are assigned to channels by the RF converters 405, and the plurality of channels, or single bit streams are frequency-multiplexed and transmitted by the frequency multiplexer 406 through the transmission cable 415 to the receiver 407.

In the receiver 407, the tuner 409 is externally preset to have the program number indicating the program of analog video signals to be displayed on the monitor 408 and the channel number to which the program is assigned.

Thus, the tuner 409 selects the channel corresponding to the previously fixed channel number from the plurality of channels sent through the transmission cable 415. The digital demodulator 410 digitally demodulates the single bit stream assigned to the channel selected by the tuner 409. The waveform equalizer 411 removes a ghost from the demodulated single bit stream, and then the channel decoder 412 makes error correction on the basis of the error correction code. In addition, since the tuner 409 sends the previously fixed program number to the demultiplexer 413, the digital video signal of the program indicated by the program number sent from the tuner 409 is separated from the single bit stream by the demultiplexer 413. The separated digital video signal is converted into the analog video signal by the digital video expander 414, and displayed on the monitor 408 which serves as a display.

In this video multiplex transmission system, since the digital video signals corresponding to a plurality of programs can be assigned to and transmitted on a single channel, it is possible to find out the possibility of a new service.

In the CATV bidirectional video service having the frequency bands arrangement shown in FIG. 3, when the receiver receiving the analog video signal transmitted on the analog-system downstream band 302 requires to display text or characters which indicate emergency information such as a natural calamity or incident, the transmitter multiplexes the analog video signal and an analog information signal of the text to be displayed as the emergency information, which is usually called "telop" display.

For example, JP-A-60-65673 discloses a method of sequentially displaying text on a television receiver by mixing a television signal and a text signal synchronized with the television signal.

FIG. 5 is a block diagram of a text signal processor for executing the method disclosed in the JP-A-60-65673 gazette.

Referring to FIG. 5, there are shown a television camera 501, a television signal output terminal 502, an output terminal 503 for horizontal/vertical synchronizing signals synchronized with the television signal, a text signal generator 504 for generating the text signal synchronized with the television signal, a mixer 505 for mixing the television signal and the text signal, a start signal generator 506 for generating a start signal which notifies the mixer 505 of when the text signal is started to mix, a variable gate pulse generator 507 for generating a gate signal which rises up just when the start signal is supplied and of which the pulse width increases horizontally with the lapse of time, and a gate circuit 508 for gating the text signal by the gate signal.

FIG. 6 is the display screen of a television receiver on which the letters in the text are displayed by the method disclosed in the JP-A-60-65673.

In FIG. 6, reference numeral 601 represents the display screen, and 602 the gate start position on the display screen 601 at which the gate signal is supplied to start displaying the letters.

In the text signal processor illustrated in FIG. 5, the variable gate pulse generator 507, when receiving the start signal from the start signal generator 506, causes the gate signal to rise up at the gate start position 602 indicated in FIG. 6 and to increase the pulse width horizontally with the lapse of time. The gate circuit 508 responds to the gate signal fed from the variable gate pulse generator 507 to open its gate to the text signal fed from the text signal generator 504. The mixer 505 mixes the text signal produced from the gate circuit 508 and the television signal.

Thus, black letters 603 are displayed on the screen 601 of the television receiver as shown in FIG. 6. Since the width of the pulse signal is increased horizontally with the lapse of time, incompletely displayed letters 604 indicated as white text are also sequentially turned black.

The above-mentioned known example of the existing CATV video service for transmitting analog video signals is excellent in displaying the text of emergence information on the receiver side which are receiving the analog video signals.

However, in order to offer a multi-channel service such as video-on-demand (VOD) or near-video-on-demand (NVOD) by the above known system, the digital video signals are necessary to be once expanded/decoded on the transmitter side, resulting in very high cost because the digital video signals to be transmitted on multiple channels in real time to the receivers are already highly efficiently compressed/coded by MPEG2 coders or the like on the software vender side.

Here the VOD is the function to search a plurality of programs for the digital video signal of a program requested by the subscriber and transmit it to the subscriber by the interaction between the subscriber and the software vender. The NVOD is the function to make a plurality of digital video signals of the same program ready for being transmitted at intervals of about 10 to 15 minutes when a plurality of subscribers request one program, and to start transmitting the digital video signal near the request time.

SUMMARY OF THE INVENTION

Accordingly, in view of the above problems, it is an object of the invention to provide a technique for transmitting and receiving digital video signals for a multi-channel service such as VOD or NVOD, in which the highly efficiently compressed/coded digital video signals are not necessary to be once expanded/decoded on the transmitter side and the text of emergency information can be displayed together with the video images on the receiver side.

According to one aspect of the invention, in order to achieve the above object, there is provided a digital signal transmission system having a transmitter which includes:

priority information adding means for adding N-level (N is a positive number) priority information to a digital information signal of text;

first multiplexing means for multiplexing a plurality of compressed digital video signals of video images to form a plurality of single bit streams indicating physical channels;

second multiplexing means for multiplexing the digital information signal having the priority information added by the priority information adding means and each of the plurality of single bit streams produced from the first multiplexing means; and transmitting means for assigning the plurality of single bit streams having the digital information signal multiplexed by the second multiplexing means to a plurality of frequency channels on a transmission path and transmitting those single bit streams on the channels, and a receiver which includes:

demultiplexing means for demultiplexing the single bit streams transmitted from the transmitter on the plurality of frequency channels to obtain one single bit stream and separate the digital information signal from the single bit stream;

discriminating means for deciding whether the digital information signal should be displayed on the basis of previously fixed conditions of the priority information added to the digital information signal which has been separated by the demultiplexing means;

first reproducing means for reproducing the digital video signal obtained by the demultiplexing means into a video image and displaying the image; and second reproducing means for reproducing the digital information signal separated by the demultiplexing means into the text and mixing the reproduced text with the image which has been displayed by the first reproducing means when the digital information signal is decided to be displayed.

The priority information may be, for example, N-level priority information of which the value is raised as the importance is increased.

At this time, the receiver further includes value storage means for having stored therein a previously fixed value M (M is a positive number, and M≦N). In addition, the discriminating means decides that the digital information signal should not be reproduced when the level of the priority information added to the digital information signal that has been separated by the demultiplexing means is smaller than the fixed value M stored in the value storage means, and decides that the digital information signal should be reproduced when the level of the priority information is equal to or larger than the fixed value M.

According to another modification, the priority information may be, for example, two-level priority information indicating whether forced display should be made or not.

At this time, the receiver further includes reproduce-or-not information storage means having stored therein the information that is previously fixed and that indicates whether the digital information signal should be reproduced or not. If the priority information added to the digital information signal which the demultiplexing means has separated indicates that the digital information signal should be forcibly displayed, the discriminating means decides that the digital information signal should be reproduced irrespective of the information stored in the reproduce-or-not information storage means. On the contrary, if the priority information added to the digital information signal does not indicate that the digital information signal should be forcibly displayed, and if the information stored in the reproduce-or-not information storage means indicates that it is necessary to produce, the discriminating means decides that the digital information signal should be displayed. In this case, if the information stored in the reproduce-or-not information storage means indicates that it is not necessary to reproduce, the discriminating means decides that the digital information signal should not be displayed.

Moreover, according to another aspect of the invention, there is provided a digital signal transmission system having a transmitter which includes:

identification information adding means for adding to a digital information signal of text identification information indicating the contents of the text of the digital information signal;

first multiplexing means for multiplexing a plurality of compressed digital video signals of images to form a plurality of single bit streams;

second multiplexing means for multiplexing the digital information signal having the identification information added by the identification information adding means and each of the plurality of single bit streams produced from the first multiplexing means; and transmitting means for respectively assigning the plurality of single bit streams each having the digital information signal multiplexed by the second multiplexing means to a plurality of frequency channels on a transmission path and transmitting the single bit streams on the channels, and a receiver which includes:

demultiplexing means for demultiplexing the single bit streams transmitted on the plurality of channels from the transmitter to separate the digital video signal and the digital information signal from any one of the single bit streams;

priority order storage means having stored therein priority orders which are previously fixed for the kinds of the identification information according to the identification information;

discriminating means for deciding whether the digital information signal should be displayed on the basis of the priority orders which the priority order storage means has stored in accordance with the identification information added to the separated digital information signal;

first reproducing means for reproducing and displaying the image of the digital video signal separated by the demultiplexing means; and second reproducing means for reproducing the text of the digital information signal separated by the demultiplexing means and mixing the reproduced text with the image displayed by the first reproducing means if the discriminating means decides that the digital information signal should be displayed.

In addition, in any one of the digital signal transmission systems given above, the transmitter may further have generator means for generating the digital information signal.

In this specification, "text" or "characters" include symbols and graphically produced characters.

The action of the digital signal transmission systems will be mentioned. In the transmitter, the priority information adding means adds N-level priority information to the digital information signal of text. The second multiplexing means multiplexes the digital information signal having the priority information added and each of the plurality of single bit streams produced by the first multiplexing means. The transmitting means assigns the plurality of single bit streams each having the digital information signal to a plurality of frequency channels on a transmission path and transmits them on the channels.

In the receiver, the demultiplexing means demultiplexes the plurality of single bit streams transmitted on the frequency channels from the transmitter so that the digital video signal of a certain one of the single bit streams which is specified on the receiver side can be separated from the specified single bit stream and that the digital information signal can be separated from the specified single bit stream. The discriminating means decides whether the digital information signal should be reproduced or not on the basis of the priority information added to the digital information signal which the demultiplexing means has separated.

The first reproducing means reproduces and displays the image of the digital video signal separated by the demultiplexing means. At this time, the second reproducing means, when the discriminating means decides that the digital information signal should be displayed, reproduces the text of the digital information signal separated by the demultiplexing means and mixes the reproduced text with the image displayed by the first reproducing means.

Therefore, according to the present invention, in a digital signal transmission system for offering a multi-channel service such as VOD or NVOD, the highly compressed/coded digital video signals are transmitted from the transmitter to the receiver, and the receiver can display the text of emergency information or the like together with an image, in which case the digital video signals are not necessary to be once expanded/decoded on the transmitter side.

BRIEF DESCRIPTION OF THE DRAWINGS

FIGS. 7A–7C show the streams in the transmitter of the first embodiment.

FIGS. 8A and 8B show the streams in the receiver of the first embodiment.

DESCRIPTION OF THE PREFERRED EMBODIMENTS

Embodiments of the invention will be described with reference to the accompanying drawings.

The first embodiment of the invention will be mentioned.

Figure 1:
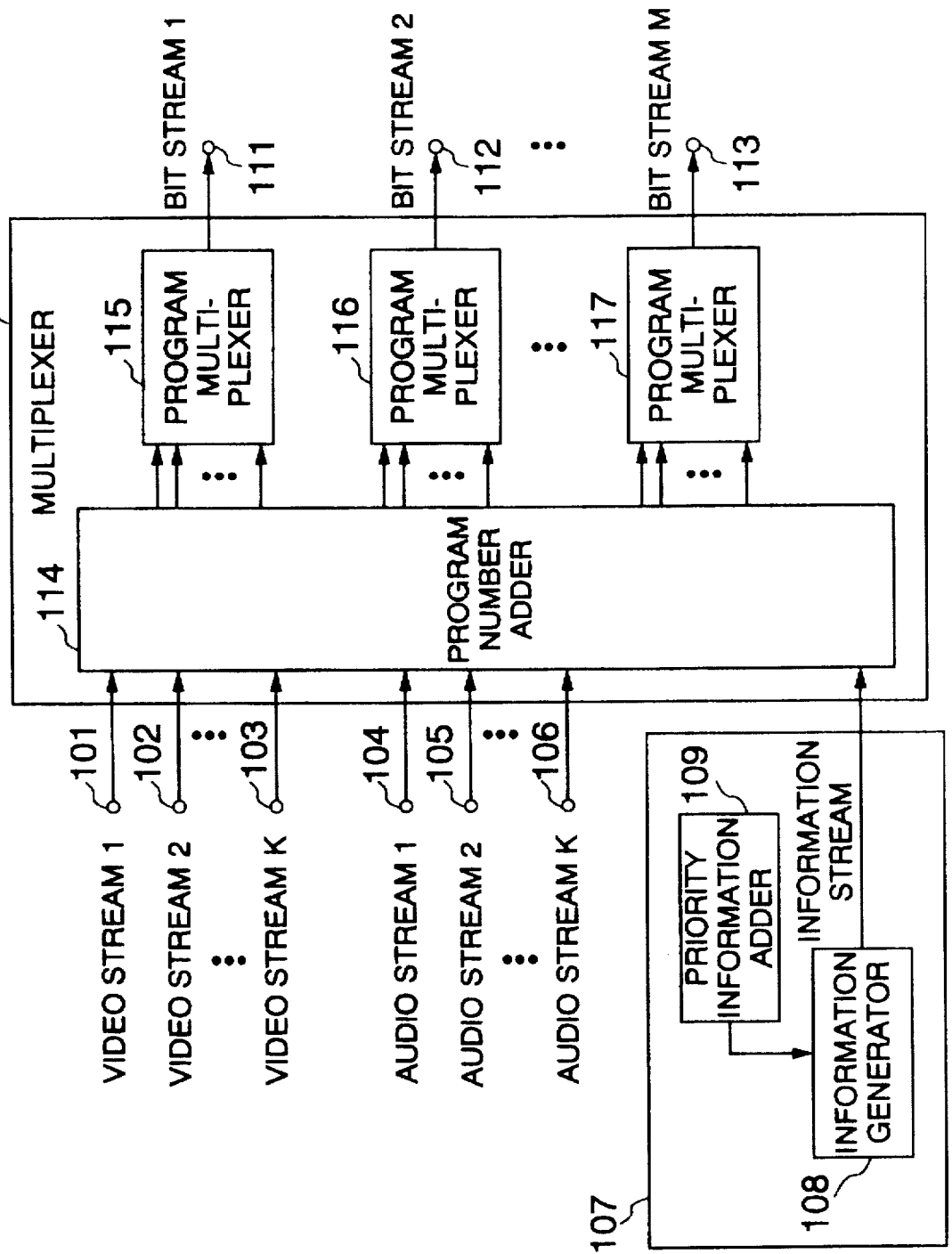
FIG. 1 is a block diagram of the transmitter of the digital signal transmission system of the first embodiment.

FIG. 1 is a block diagram of the transmitter of the digital signal transmission system of the first embodiment.

Referring to FIG. 1, there are shown K video stream input terminals 101–103 to which digital video signals (hereinafter, referred to as video streams) compressed by MEPEG2 are respectively supplied from K different video sources, and K audio stream input terminals 104-1-6 to which compressed digital audio signals (hereinafter referred to as audio streams) are respectively supplied from K different audio sources.

There is also shown an information stream generator 107 for producing a digital information signal (hereinafter referred to as information stream) of text or characters to be displayed as emergency information. The information stream generator 107 includes an information generator 108 for producing the information stream of text to be displayed as emergency information, and a priority information adder 109 for adding priority information to the information stream produced from the information generator 108.

In addition, a multiplexer 110 is provided which multiplexes the K video streams from the video stream input terminals 101–103, the K audio streams from the audio stream input terminals 104–106, and the information stream from the information stream generator 107 to form flows of single trains of bits (hereinafter, referred to as single bit streams). The multiplexer 110 has a program number adder 114 for adding program numbers to the respective ones of the K video streams from the video stream input terminals 101–103, the K audio streams from the audio stream input terminals 104–106 and the information stream from the information stream generator 107, and M program number multiplexers 115–117 for first multiplexing the video streams and the audio streams and then multiplexing the first-multiplexed streams with program numbers added by the program number adder 114 and the information stream from the generator 107 to produce the single bit streams.

Also, shown at 111–113 are M bit stream output terminals through which the produced single bit streams are supplied from the multiplexer 110. The single bit streams generated from the M bit stream output terminals 111–113 are transmitted from the transmitter to the receiver on a multi-channel digital-system downstream band having M channels.

Figure 7B:
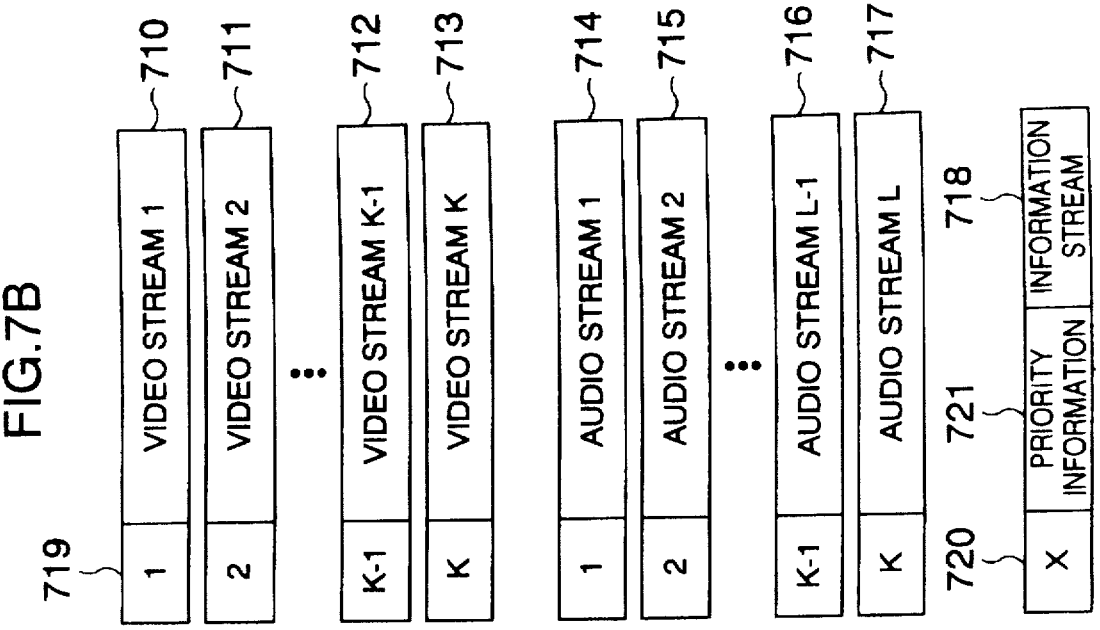
Figure 7A:
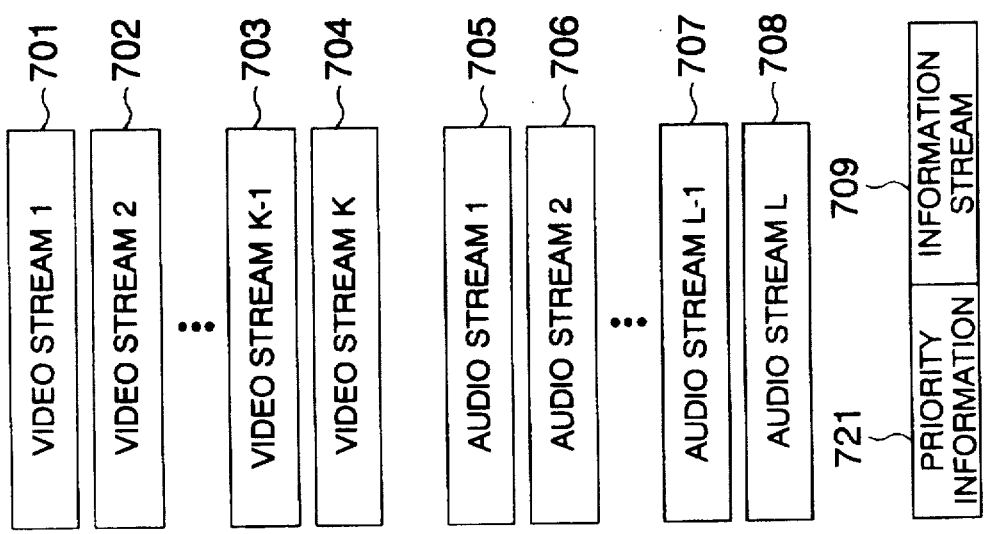

With reference to FIGS. 7A–7C, a description will be made of the operation of the transmitter, or the process of multiplexing the K video streams from the video stream input terminals 101–103, K audio streams from the audio stream input terminals 104–106 and information stream from the information stream generator 107 to form M single bit streams.

In FIG. 7A, the K video streams from the video stream input terminals 101–103 are represented by reference numerals 701–704, and the K audio streams from the audio stream input terminals 104–106 by reference numerals 705–708.

The information steam from the information stream generator 107 is designated by a reference numeral 709. The priority information denoted by a reference numeral 721 is already added to the information stream 709 by the priority information adder 109.

In FIG. 7B, reference numerals 710–713 represent the K video streams with a program number 719 added by the program number adder 114, 714–717 the K audio streams with the program number 719 added by the program number adder 114, and 718 the information stream with a program number 720 added by the program number adder 114.

As shown in FIGS. 7A–7C, the video stream 701 and audio stream 705 are streams of the same program, or "program 1", and similarly the video stream 704 and audio stream 708 are streams of the same program, or "program K". Thus, the K video streams 710–713 are respectively added with "1"–"K" as the program number 719, and the K audio streams 714–717 with "1"–"K" as the program number 719. In addition, the information stream 718 is added with "X" as the program number 720.

In FIG. 7C, a reference numeral 722 represents the single bit stream supplied from the program multiplexer 115 through the bit stream output terminal 111, and 723 the single bit stream supplied from the program multiplexer 117 through the bit stream output terminal 113.

As illustrated in FIGS. 7A–7C, the streams formed of "program 1" and "program 2" are assigned to "channel 1 (CH1)" and transmitted thereon, and similarly the streams formed of "program K–1" and "program K" are assigned to "channel M (CHM)" and transmitted thereon. Therefore, the single bit stream 722 has the video streams 710, 711, audio streams 714, 715 and information stream 718 multiplexed with each other, and the single bit stream 723 has the video streams 712, 713, audio streams 716, 717 and information stream 718 multiplexed to each other.

Referring back to FIG. 1, the information generator 108 of the information stream generator 107 generates the digital information signal of text to be displayed as emergency information, and the priority information adder 109 of the generator 107 generates the priority information and adds it to the digital information signal. The result is that the information stream generator 107 produces the information stream 709 shown in FIG. 7A.

The priority information is an N-level value (N is a positive number) on which it is decided whether the text of the information stream are forcibly displayed or not. In this embodiment, the priority information is five-level information of "1"–"5" of which the value is raised in five steps as the importance of the text increases.

The information stream 709 produced from the information stream generator 107 is supplied to the program adder 114 together with the K video streams 701–704 from the video stream input terminals 101–103 and the K audio streams 705–708 from the audio stream input terminals 104–106.

The program number adder 114 adds program numbers to the respective input video streams 701–704, audio streams 705–708 and information stream 709 and thus produces the video streams 710–713, audio streams 714–717 and information stream 718 as shown in FIG. 7B.

The video streams 710–713, audio streams 714–717 and information stream 718 with their program numbers added by the program number adder 114 are multiplexed by the program number multiplexers 115–117 to produce the single bit streams 722, 723 shown in FIG. 7C.

While K programs are produced from the K video streams and K audio streams as illustrated in FIGS. 7A–7C, it is possible to produce programs from only the audio streams or only the video streams. In this case, the number of video streams is not always necessary to equal to that of the audio streams.

Figure 2:
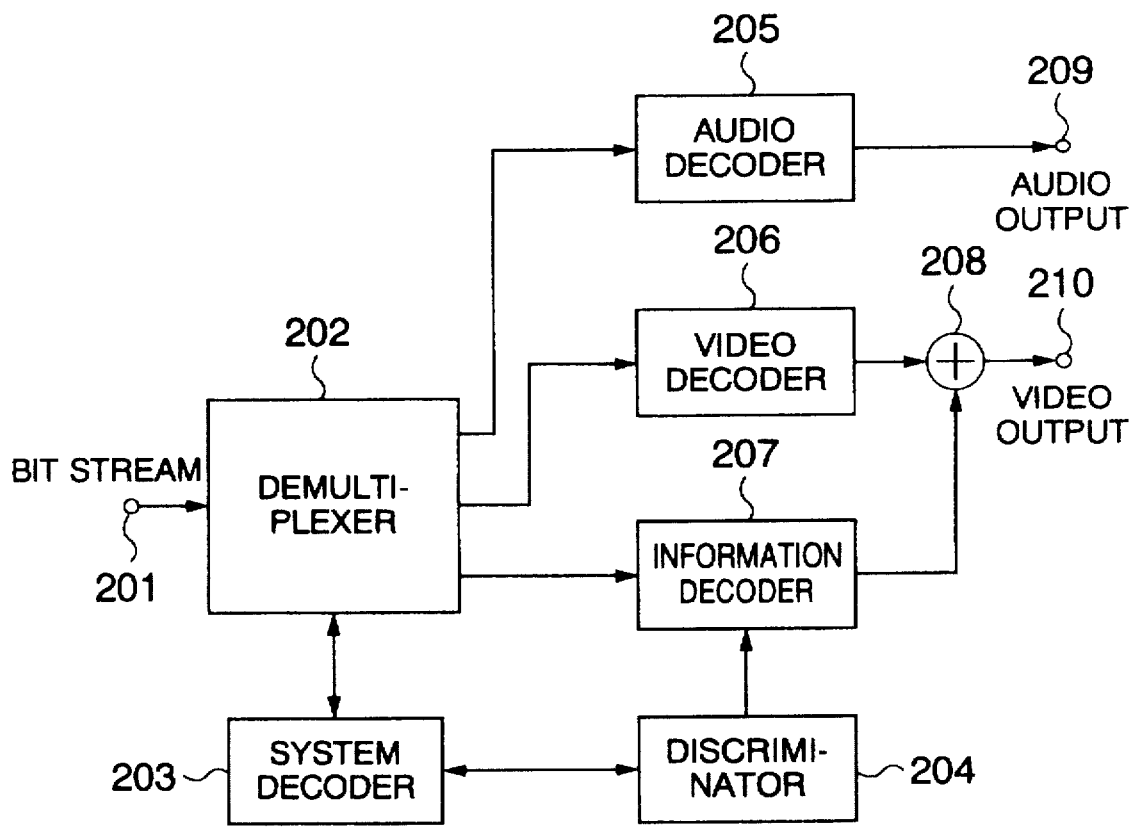
FIG. 2 is a block diagram of the receiver of the digital signal transmission system of the first embodiment.
Figure 3:
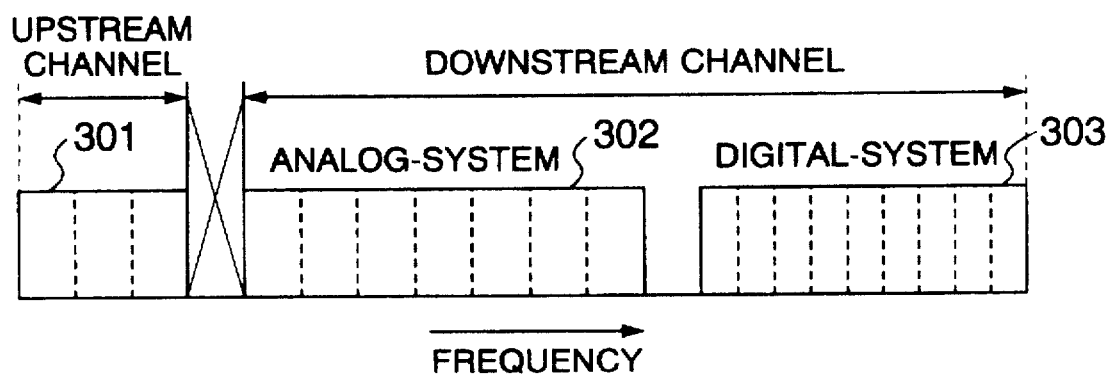
FIG. 3 shows an example of the frequency bands in the CATV bidirectional video service.
Figure 4:
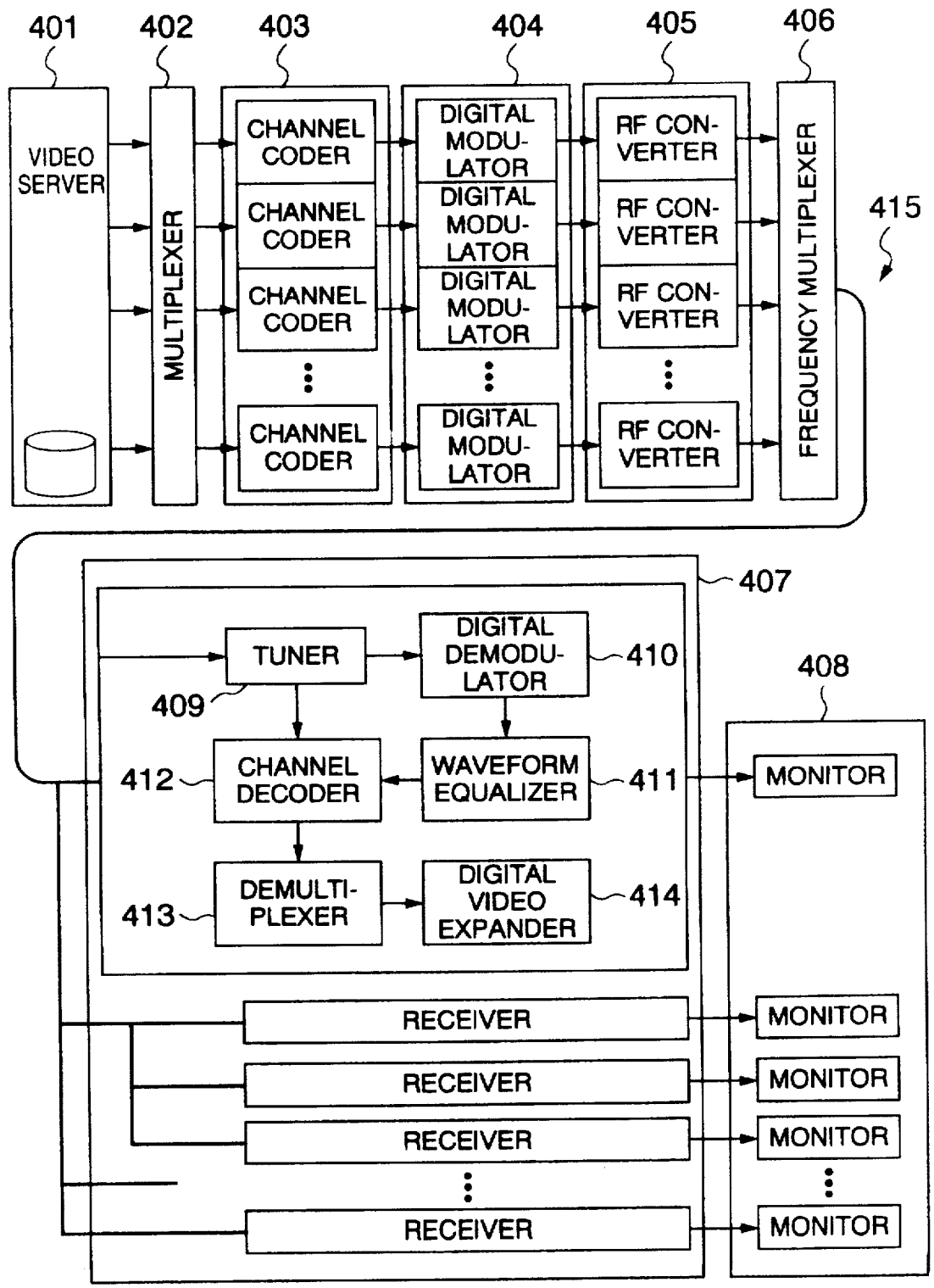
FIG. 4 is a block diagram of a conventional video multiplex transmission system.
Figure 5:
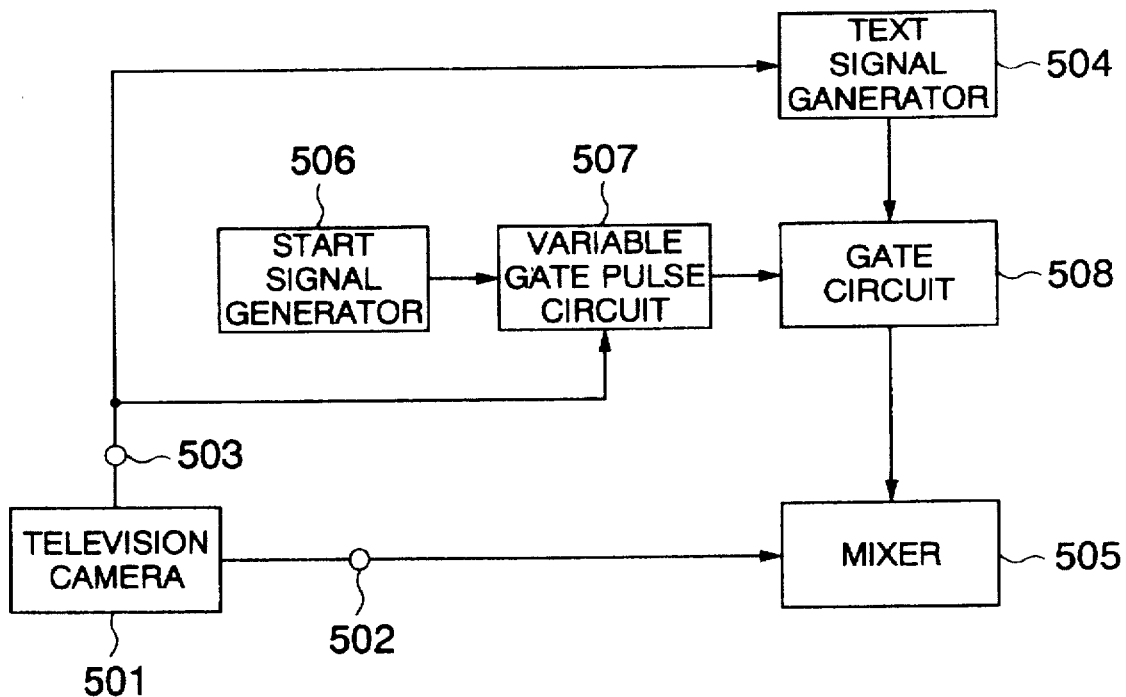
FIG. 5 is a block diagram of the text signal processor for executing the conventional example.
Figure 6:
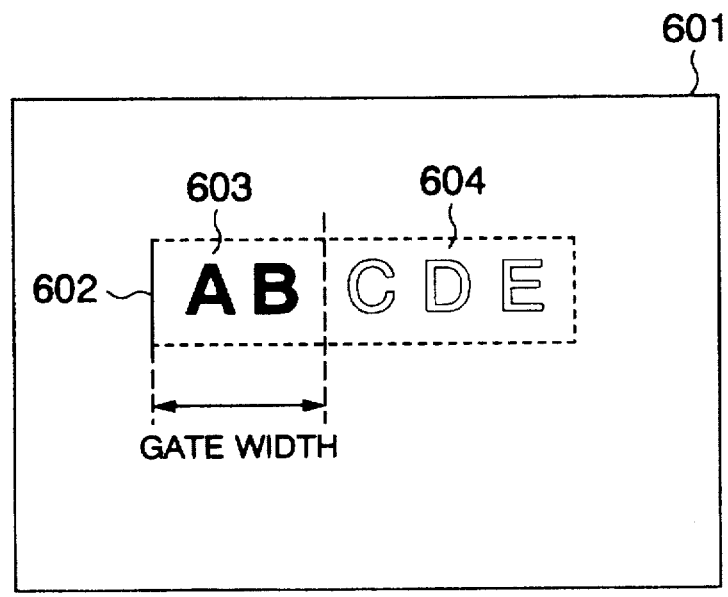
FIG. 6 shows an example of the display screen of the television receiver in the prior art.

FIG. 2 is a block diagram of the receiver of the digital signal transmission system of the first embodiment.

Referring to FIG. 2, there are shown a bit stream input terminal 201 which receives the single bit stream assigned to any one of the M channels, a demultiplexer 202 for separating the input single bit stream to the bit stream input terminal 201 into the desired video stream, audio stream and information stream, a system decoder 203 for extracting the program number and priority information from the information stream separated by the demultiplexer 202, and a discriminator 204 for deciding the level of the priority information extracted by the system decoder 203.

In addition, there are shown an audio decoder 205 for converting the audio stream separated by the demultiplexer 202 to an analog audio signal, a video decoder 206 for converting the video stream separated by the demultiplexer 202 to an analog video signal, an information decoder 207 for converting the information stream separated by the demultiplexer 202 to an analog information signal, a mixer 208 for mixing the analog information signal from the information decoder 207 with the analog video signal from the video decoder 206, an audio output terminal 209 at which the audio decoder 205 produces the analog audio signal, and a video output terminal 210 at which the mixer 208 produces a mixture of the analog video signal and the analog information signal.

A description will be made of the operation of the receiver, or the process of separating the single bit stream to the bit stream input terminal 201 into the video stream, audio stream and information stream, with reference to FIGS. 8A–8B.

In FIG. 8A, reference numeral 801 represents the single bit stream to the bit stream input terminal 201.

In FIG. 8B, reference numeral 802 denotes the video streams separated from the single bit stream 801, 803 the audio streams separated from the single bit stream 801, and 804 the information streams separated from the single bit stream 801.

The single bit stream supplied from the bit stream input terminal 201 to the demultiplexer 202 is the single bit stream assigned to the channel that is selected by a tuner (not shown) from the M channels which the receiver receives. This single bit stream is already properly processed by a digital demodulator or the like (not shown).

In FIGS. 8A–8B, it is assumed that the tuner selects "CH1". Therefore, the single bit stream 801 has the video streams 710, 711, audio streams 714, 715 and information stream 718 multiplexed as in FIG. 7B.

Referring back to FIG. 2, after the single bit stream is supplied from the bit stream input terminal 201 to the demultiplexer 202, the system decoder 203 extracts the priority information and all the program numbers from it.

The discriminator 204 analyzes the priority information extracted by the system decoder 203 and decides whether there is the need to display the text of the information stream included in the single bit stream that has been fed to the demultiplexer 202 from the bit stream input terminal 201.

In this receiver, the level of the priority information showing the degree of importance in displaying the text of the information stream is previously set in the discriminator 204 from the outside. Here, it is assumed that "3" is previously set in the discriminator.

Thus, the discriminator 204 compares the level of the priority information from the system decoder 203 with the externally set level ("3"). When the level of the priority information is smaller than the set level, or "3", it is decided that there is no need to forcibly display the text of the information stream multiplexed within the single bit stream that has been supplied from the bit stream input terminal 201 to the demultiplexer 202. When the level of the priority information is equal to or larger than "3", it is decided that the text are necessary to forcibly display.

Therefore, the receiver is able to forcibly display the text of only much important emergency information which is required by the subscriber having this receiver installed.

The discriminator 204, when deciding that the forced display is necessary, notifies the information decoder 207 of this fact.

Also, in the receiver, the program number of the program of which the analog video signal and analog audio signal are necessary to be obtained, and the channel number of the channel to which this program is assigned are previously set in the tuner by the external operation, and the tuner sends the fixed program number to the system decoder 203.

The system decoder 203 supplies this program number to the demultiplexer 202 and controls the demultiplexer 202 to demultiplex the video stream, audio stream and information stream of the program corresponding to this program number.

Thus, the demultiplexer 202 separates the video stream, audio stream and information stream of which the program number coincides with that sent from the system decoder 203 from the single bit stream fed to the bit stream input terminal 201.

Since the program number fixed by the external operation is "program 1" as in FIGS. 8A–8B, the demultiplexer 202 produces the video stream 802, audio stream 803 and information stream 804 which constitute the "program 1".

The video stream produced from the demultiplexer 202 is converted to the analog video signal by the video decoder 206. The information stream produced from the demultiplexer 202 is converted to the analog information signal by the information decoder 207 only when the discriminator 204 notifies the information decoder that the forcible display is necessary. The analog information signal is fed to the mixer 208 where it is mixed with the analog video signal from the video decoder 206. The analog video signal with the analog information signal mixed is produced at the output terminal 210. The audio stream from the demultiplexer 202 is converted to the analog audio signal by the audio decoder 205 and produced at the audio output terminal 209.

According to this embodiment as described above, since the transmitter is constructed to multiplex the information stream of text to be displayed as emergency information when an emergency such as a natural calamity or an incident occurs, together with the video stream and audio stream which are assigned to each channel and transmitted thereon, it can transmit the information stream without once expanding/decoding the highly efficiently compressed/decoded digital video signal and digital audio signal (video stream and audio stream) to the receiver capable of bidirectional communication on the multi-channel digital-system downstream band.

In addition, since the receiver capable of bidirectional communication on the multi-channel digital-system downstream band is able to decide whether it is necessary to forcibly display the text of the information stream sent from the transmitter on the basis of the priority information that is previously added to the information stream of which the text are to be displayed as emergency information, much important emergency information can be forcibly displayed which is required by the subscriber having this receiver installed.

The second embodiment of the invention will be described below.

The block diagram of the transmitter of the digital signal transmission system of the second embodiment is the same as that of FIG. 1 and thus not shown. The block diagram of the receiver of the digital signal transmission system of the second embodiment is the same as that of FIG. 2 and thus not shown.

While the priority information in the first embodiment is 5-level information of "1"–"5" which is raised in five levels as the importance of the text of the information stream is increased, the priority information in the second embodiment is particularly two-level information of "ON/OFF" which indicates that the text of the information stream are forcibly displayed or not.

That is, in this embodiment, the priority information adder 109 of the information stream generator 107 adds priority information of "ON" for ordering forced display to the digital information signal when the receiver is forced to display the text of the digital information signal generated from the information generator 108.

In that case, the operation of the discriminator 204 in the receiver is different from that in the first embodiment. A description will be made of the operation of the discriminator 204 to which the priority information of two levels is supplied.

In the receiver, information indicating whether it is necessary to display the text of the information stream is previously externally set in the discriminator 204.

Thus, if the priority information extracted by the system decoder 203 is "ON", the discriminator 204 decides that the forced display is required regardless of the externally fixed information. In addition, if the priority information extracted by the system decoder 203 is "OFF", and if the externally fixed information indicates that it is necessary to display, the discriminator 204 decides that the digital information signal should be forcibly displayed. In this case, if the externally fixed information indicates that it is not necessary to display, the discriminator 204 decides that the digital information signal should not be forcibly displayed.

Therefore, even when the subscribers having the receivers installed do not desire that the text are displayed, the transmitter can order the receivers to forcibly display the text of particular emergency information such as a great earthquake or a great incident.

In the first and second embodiments, all the program multiplexers 115–117 multiplex the video streams, audio streams and information streams having their program numbers added by the program number adder 114 and produce the single bit streams. Thus, since the same information stream is multiplexed on all the channels, the receivers capable of bidirectional communication on multi-channel digital-system downstream band are able to forcibly display the text of emergency information even when receiving the programs on any channels.

However, only the video streams and audio streams except the information stream may be multiplexed depending on the program multiplexers. In other words, it is possible that the same information stream is not multiplexed on all the channels.

The third embodiment of the invention will hereinafter be described.

Figure 9:
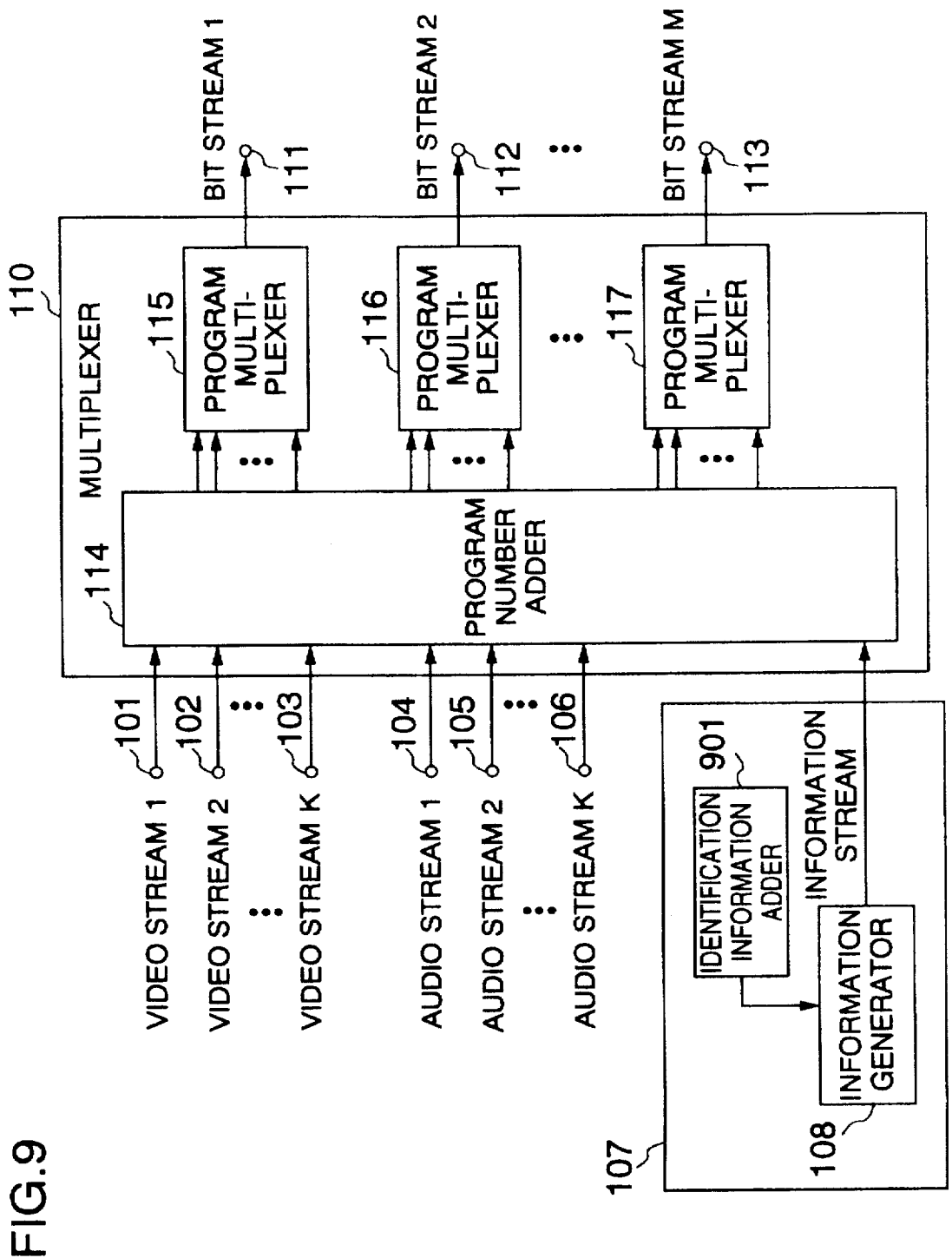
FIG. 9 is a block diagram of the transmitter of the digital signal transmission system of the third embodiment.

FIG. 9 is a block diagram of the transmitter of the digital signal transmission system of the third embodiment.

In FIG. 9, reference numeral 901 represents an identification information adder, and the other elements are the same as in FIG. 1.

In the transmitter of this embodiment, identification information indicating the contents of the text of the information stream is added to the information stream. In the receivers, it is decided whether the text of the information stream are forcibly displayed or not on the basis of the identification information added to the information stream.

Figure 10:
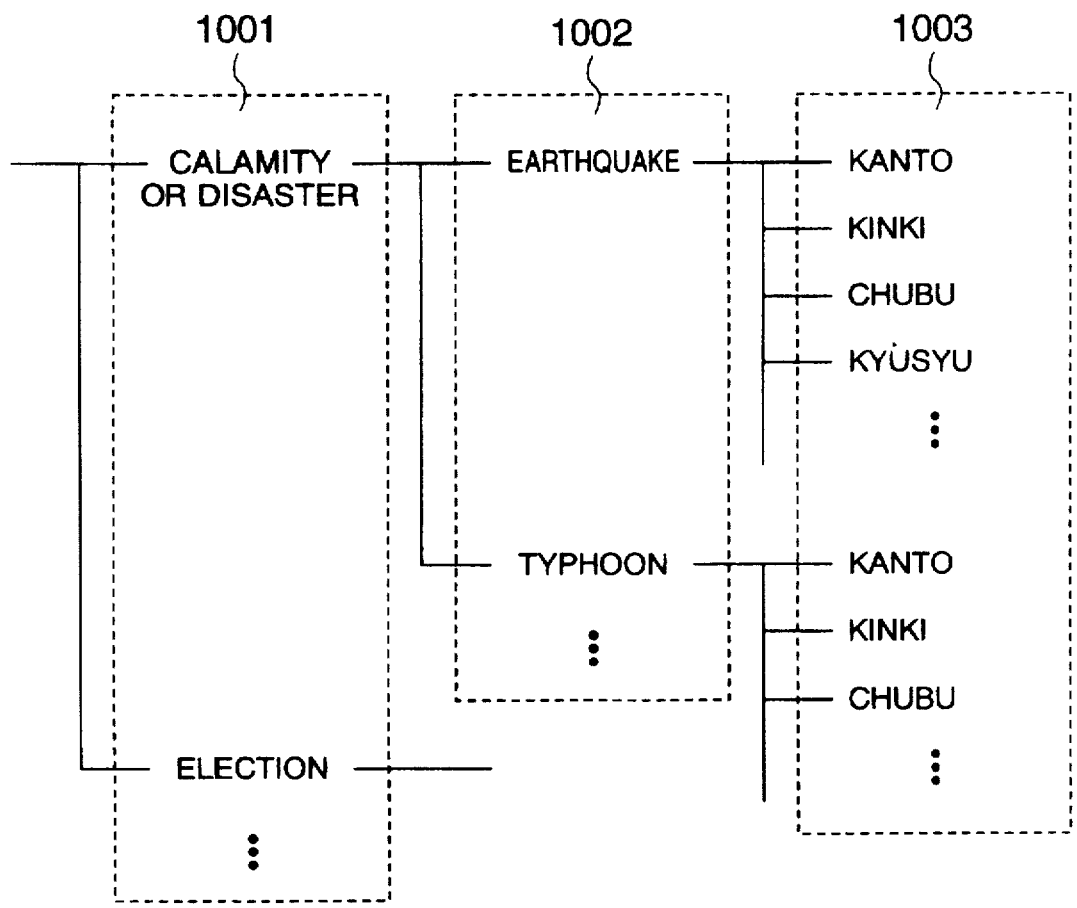
FIG. 10 shows an example of the identification information in the third embodiment.

FIG. 10 shows one example of the identification information.

The identification information is formed of a large classification item 1101, a middle classification item 1102 and a small classification item 1103. In the example of FIG. 10, the large classification item 1101 can be selected from "disaster" and "election". The middle classification item 1102 associated with the large classification item 1101 of "disaster" can be chosen from "earthquake" and "typhoon". The small classification item 1103 associated with the middle classification items 1102 of "earthquake" and "typhoon" can be taken from the districts of "Kanto area of Japan", "Kinki area of Japan", "Central part of Japan" and "Kyushu district of Japan".

Figure 11:
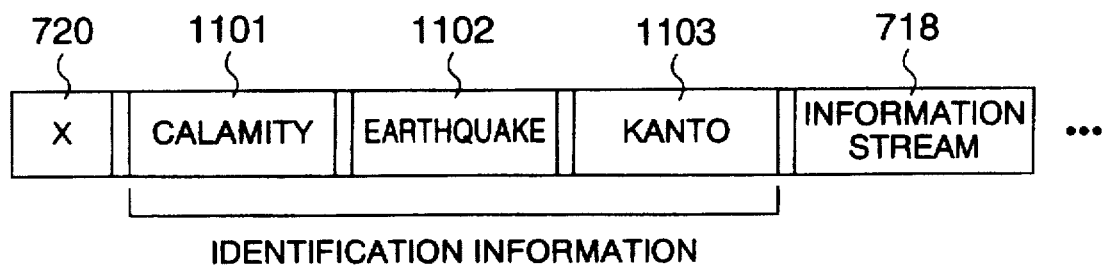
FIG. 11 shows an example of the information stream in the third embodiment.

FIG. 11 shows an example of the information stream having the identification information added.

The information stream in FIG. 11 is the same as the information stream 718 shown in FIG. 7B except for the large classification item 1101, middle classification item 1102 and small classification item 1103.

The information stream 718 in FIG. 11 indicates that "an earthquake of disaster occurred in the Kanto area of Japan".

Referring back to FIG. 9, the information generator 108 of the information stream generator 107 generates the digital information signal of text to be displayed as emergency information, and the identification information adder 901 generates the identification information indicating the contents of the digital information signal and adds the produced identification information to the digital information signal. Thus, the information stream generator 107 produces the information stream 718 shown in FIG. 11 except the program number 720.

Figure 12:
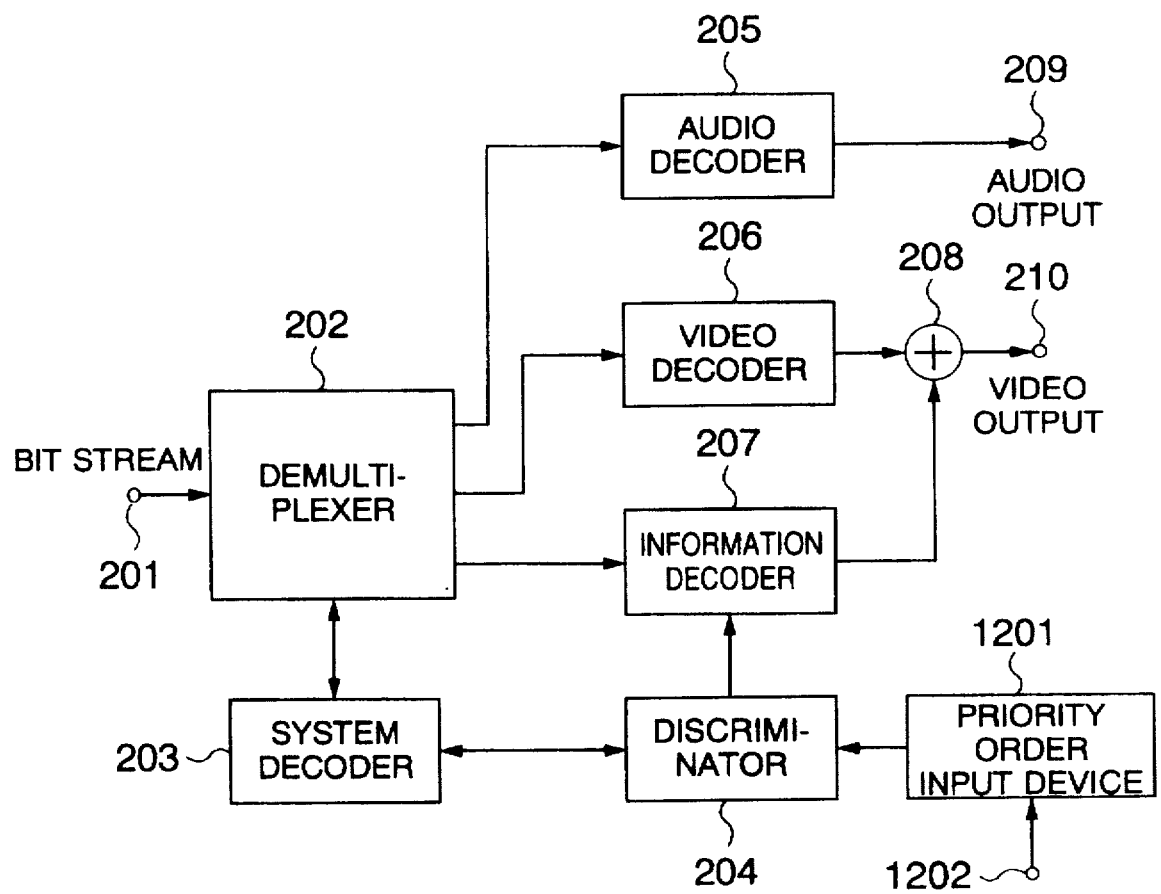
FIG. 12 is a block diagram of the receiver of the digital signal transmission system of the third embodiment.

FIG. 12 is a block diagram of the receiver of the digital signal transmission system of the third embodiment.

In FIG. 12, there are shown a priority order input device 1201 and a user's input terminal 1202. The other elements are the same as in FIG. 2.

The priority order input device 1201 is used to previously fix the priority order, which indicates whether the text of the information stream having the identification information added are forcibly displayed or not, for each kind of all the identification information added to the information stream on the basis of the contents of the input information the user externally supplies through the user's input terminal 1202. In this embodiment, it is assumed that the priority order set in the priority order input device 1201 is a two-level value of "ON" and "OFF" which indicates whether the text of the information stream are forcibly displayed or not.

Figure 13:
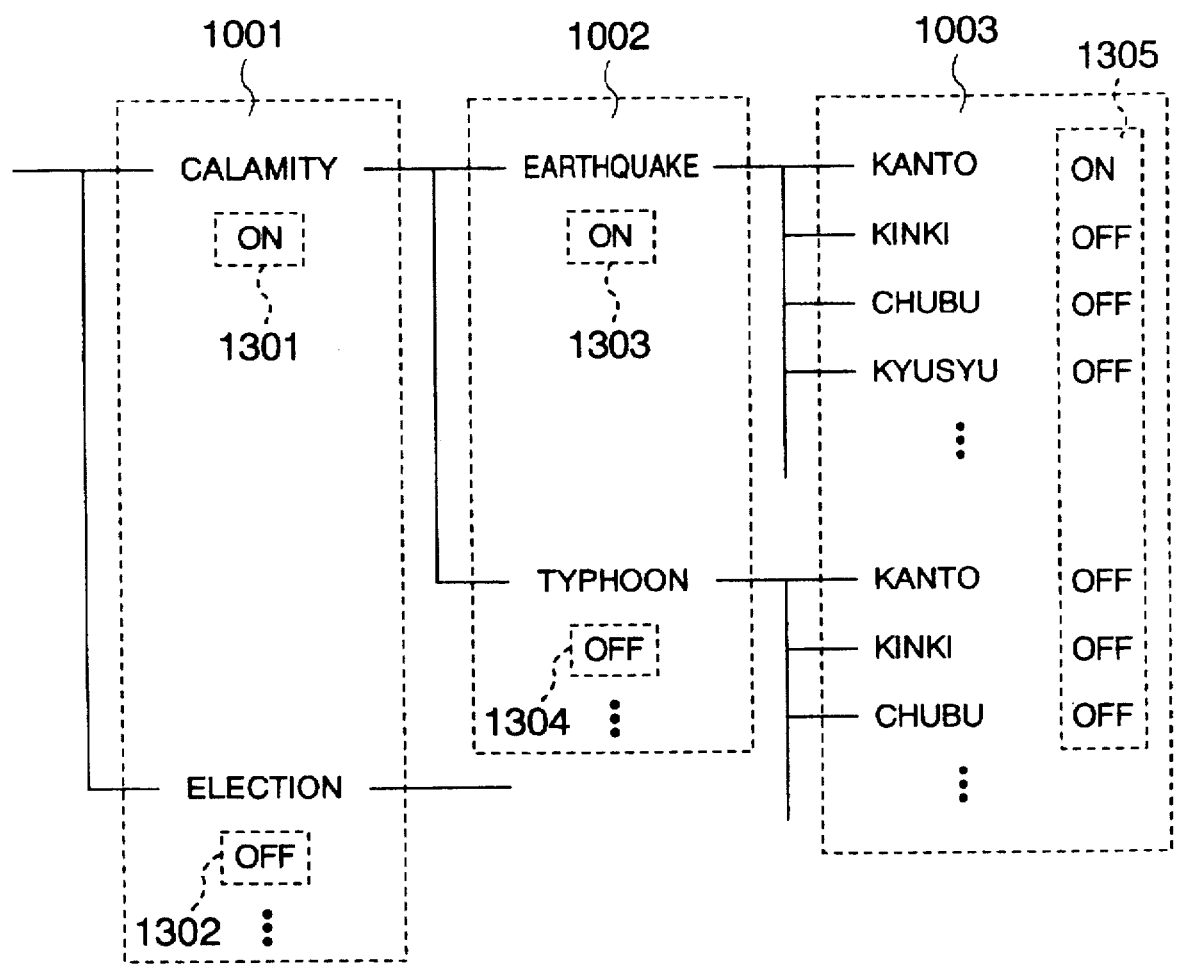
FIG. 13 shows an example of the priority orders of the identification information in the third embodiment.

FIG. 13 shows an example of the two-level priority order.

In FIG. 13, reference numerals 1301 and 1302 designate the priority orders of "disaster" and "election" in the large classification table 1101, 1303 and 1304 the priority orders of "earthquake" and "typhoon" in the middle classification table 1102, and 1305 the priority order of each district in the small classification table 1103.

In the example of FIG. 13, the priority order of "disaster" in the large classification table 1101 is "ON", and the priority order of "election" is "OFF". The priority order of "earthquake" in the middle classification 1102 is "ON", and that of "typhoon" is "OFF". In addition, the priority order of "Kanto district of Japan" in the small classification table 1103 is "ON", and those of the other districts are "OFF". In other words, the priority orders are fixed for the receiver to forcibly display the text of only the information stream having added therein the identification information of "disaster" in the large classification table 1101, "earthquake" in the middle classification table 1102 and "Kanto district" in the small classification table 1103.

Referring back to FIG. 12, the single bit stream supplied from the bit stream input terminal 201 to the demultiplexer 202 is processed by the system decoder 203 so that the identification information and all the program numbers are extracted from the single bit stream.

The identification information extracted by the system decoder 203 is supplied to the discriminator 204, which decides whether the forced display is necessary or not. If the forced display is decided to be necessary, the fact is sent to the information decoder 207. Specifically, the discriminator 204 decides that the forced display is necessary when the priority orders are "ON" which are previously set up by the priority order input device 1201 for all the large, middle and small classification items of the identification information extracted by the system decoder 203.

If, the priority orders shown in, for example, FIG. 13 are fixed in advance, the discriminator 204 decides that the text of the information stream are necessary to be forcibly displayed only when the information stream shown in FIG. 11 is received by the receiver. When the receiver receives the other information streams, the discriminator decides that the text of those information streams are not necessary to be forcibly displayed. Therefore, the receiver forcibly displays only the text of "an earthquake of disaster has occurred in the Kanto district of Japan" as emergency information.

Other forms of the identification information can be considered to be a news flash or other immediate information services which can be selectively ordered in advance. For example, key cards for desired objects can be provided as the identification information on both the vender side and the subscriber side in order that the subscriber can immediately see the results of a desired professional baseball game.

According to this embodiment as described above, since the transmitter operates so that when an emergency such as a natural calamity or incident has occurred, the information stream of text to be displayed as emergency information is multiplexed with the video stream and audio stream that are assigned to each channel and transmitted thereon, it is able to transmit the information stream to the receiver that is capable of bidirectional communication on multi-channel digital-system downstream band, in which case the transmitter does not need to once expand/decode the highly efficiently compressed/coded digital video signal and digital audio signal (video stream and audio stream).

In addition, since the receiver capable of bidirectional communication on multi-channel digital-system downstream band can decide whether the text of the information stream are necessary to be forcibly displayed on the basis of the identification information added to the information stream of text that is sent from the transmitter and displayed as emergency information, the emergency information required by the subscriber having this receiver installed can be forcibly displayed in text.

Moreover, since the receiver previously fixes the priority order for each kind of all the identification information added to the information stream, which priority order is used as the basis for deciding whether the text of the information stream are necessary to be forcibly displayed, each subscriber having the receiver installed can change the contents of the emergency information of which the text are desired to be forcibly displayed.

Any one of the first and second embodiments may be combined with the third embodiment, so that the transmitter can add both the priority information and the identification information to the digital information signal, and that the receiver can decide whether the text of the digital information signal should be displayed on the basis of both the priority information and the identification information added to the digital information signal.

Figure 14:
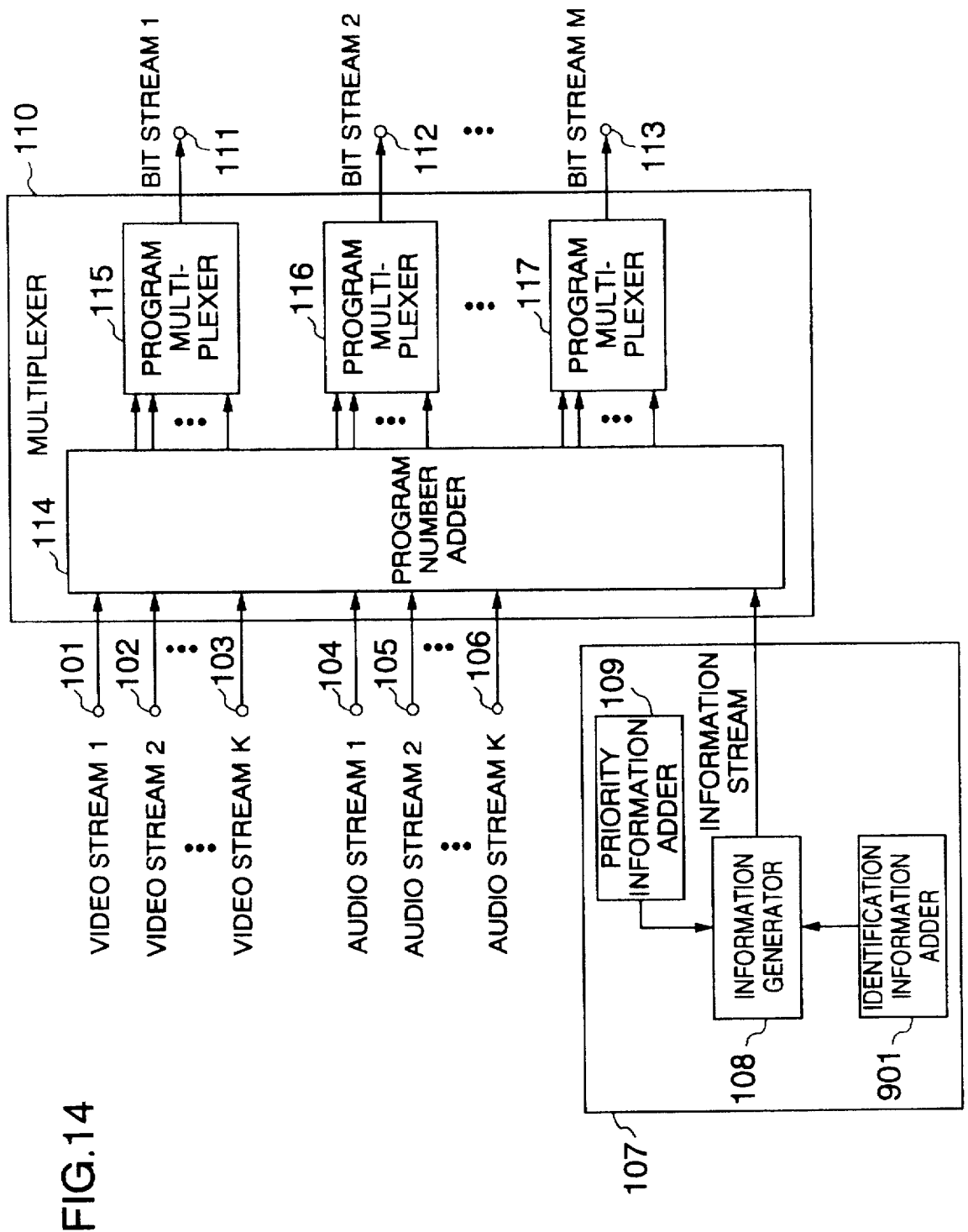
FIG. 14 is a block diagram of the transmitter of a combination of the first embodiment and third embodiment.
Figure 15:
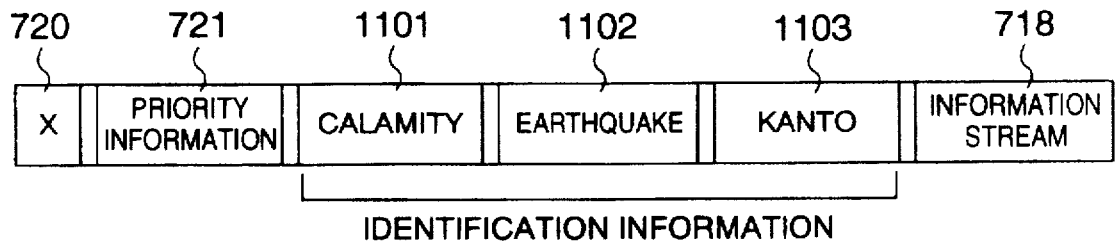
FIG. 15 shows an example of the information stream in the combination of the first embodiment and third embodiment.

For example, FIG. 14 shows a block diagram of a combination of the first embodiment and the third embodiment, and FIG. 15 shows the information stream having the priority information and identification information added.

Therefore, in the receiver, special emergency information such as a great earthquake or great incident can be forcibly displayed in text even when the subscriber having the receiver did not previously fix values for the emergency information.

The fourth embodiment of the invention will be described below.

The transmitter of the digital signal transmission system of the fourth embodiment is the same as that of the block diagram of FIG. 1.

Figure 16:
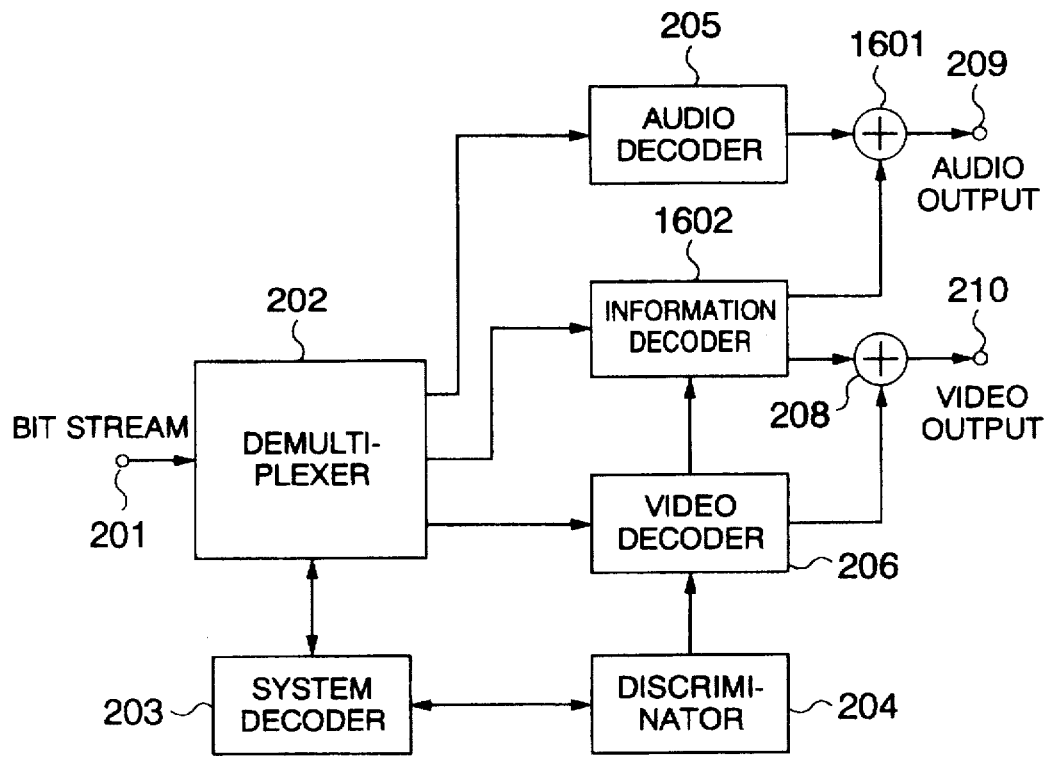
FIG. 16 is a block diagram of the receiver of the digital signal transmission system of the fourth embodiment.

FIG. 16 is a block diagram of the receiver of the digital signal transmission system of the fourth embodiment.

Referring to FIG. 16, there are shown a mixer 1601 for mixing the analog audio signal from an information decoder 1602 with the analog audio signal from the audio decoder 205, and the information decoder 1602. The other elements are the same as in FIG. 2.

In this embodiment, the information stream includes a digital audio signal of a sound that is placed before the digital information signal of text to be displayed as emergency information in order to indicate the start of the text to be displayed as emergency information.

As illustrated in FIG. 16, the information stream including the digital audio signal is processed by an information decoder 1602 so that the digital information signal and digital audio signal can be converted to the analog information signal and analog audio signal, respectively. The mixer 208 mixes the analog information signal from the information decoder 1602 with the analog video signal from the video decoder 206 to produce a mixed analog video signal at the video output terminal 210. A mixer 1601 also mixes the analog audio signal from the information decoder 1602 with the analog audio signal from the audio decoder 205 to produce a mixed analog audio signal at the audio output terminal 209.

Thus, according to this embodiment, when the receiver receives the information stream including the digital audio signal of a sound for indicating the start of the text to be displayed as emergency information, it is able to not only display the emergency information in text, but also cause a sound such as dial tone to emanate indicating the start of the text to be displayed as emergency information.

In addition, according to the construction of the receiver of this embodiment, even when all the information stream is the digital audio signal of a speech to be produced as emergency information, this digital audio signal can be converted to the analog audio signal by the information decoder.

Figure 17:
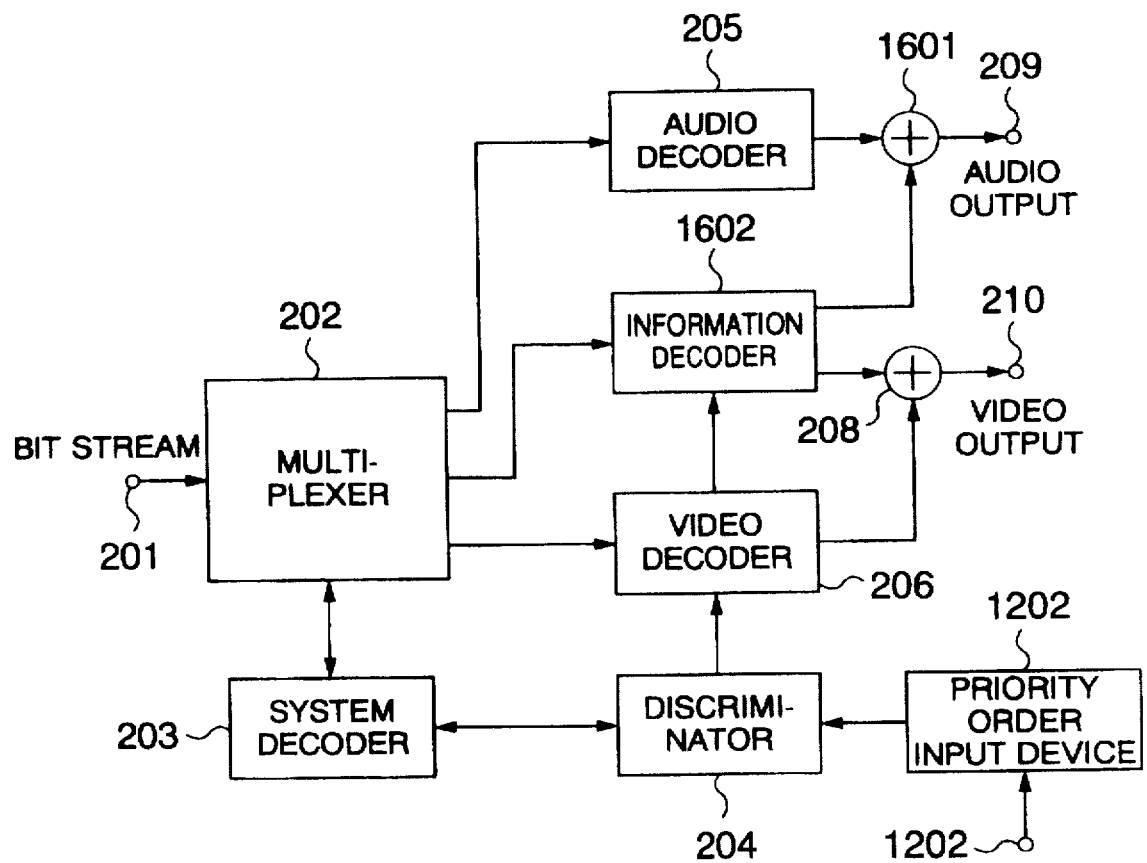
FIG. 17 is a block diagram of another construction of the receiver of the digital signal transmission system of the fourth embodiment.

The receiver in the fourth embodiment is constructed to receive the information stream to which the priority information is added as described in the sections of the first and second embodiments. When it is necessary to receive the information stream to which the identification information is added as described in the section of the third embodiment, the receiver is constructed as in FIG. 17.

What is claimed is:

1. A digital signal transmitting system comprising a transmitter and a receiver, said transmitter comprising:

priority information adding means for adding N-level (N is a positive number) priority information to a digital information signal of texts;

first multiplexing means for multiplexing a plurality of compressed digital video signals of images to form a plurality of single bit streams;

second multiplexing means for multiplexing said digital information signal having said priority information added by said priority information adding means and each of said plurality of single bit streams produced from said first multiplexing means; and transmitting means for transmitting said plurality of single bit streams each of which has said digital information signal added by said second multiplexing means, and said receiver comprising:

demultiplexing means for separating any one of said digital video signals from said plurality of single bit streams sent from said transmitter, and separating said digital information signal therefrom which has been multiplexed with said single bit streams;

discriminating means for determining whether said digital information signal is to be reproduced on the basis of previously fixed selection conditions for said priority information added to said separated digital information signal;

first reproducing means for reproducing said digital video signal separated by said demultiplexing means into an image and displaying said image; and second reproducing means for reproducing said text of said digital information signal separated by said demultiplexing means, and mixing said text with said image to be displayed by said first reproducing means when said discriminating means determines that said digital information signal is to be reproduced, wherein said priority information includes forced display information for indicating forced display, and said receiver, when receiving said forced display information, is ordered by said discriminating means to preferentially reproduce said digital information signal.

2. A digital signal transmission system comprising a transmitter and a receiver, said transmitter comprising:

priority information adding means for adding N-level (N is a positive number) priority information to a digital information signal of texts;

first multiplexing means for multiplexing a plurality of compressed digital video signals of images to form a plurality of single bit streams;

second multiplexing means for multiplexing said digital information signal having said priority information added by said priority information adding means and each of said plurality of single bit streams produced from said first multiplexing means; and transmitting means for transmitting said plurality of single bit streams each of which has said digital information signal added by said second multiplexing means, and said receiver comprising:

demultiplexing means for separating any one of said digital video signals from said plurality of single bit streams sent from said transmitter, and separating said digital information signal therefrom which has been multiplexed with said single bit streams;

discriminating means for determining whether said digital information signal is to be reproduced on the basis of previously fixed selection conditions for said priority information added to said separated digital information signal;

first reproducing means for reproducing said digital video signal separated by said demultiplexing means into an image and displaying said image; and second reproducing means for reproducing said text of said digital information signal separated by said demultiplexing means, and mixing said text with said image to be displayed by said first reproducing means when said discriminating means determines that said digital information signal is to be reproduced, wherein said priority information is two-level information which indicates whether forced display should be made or not, said receiver further has a reproduce-or-not information storage means for previously storing information which indicates whether said signal digital information signal should be displayed or not, said discriminating means decides that if the priority information added to said digital information signal which said demultiplexing means has separated indicates that said digital information signal should be forcibly displayed, the digital information signal should be reproduced irrespective of the information stored in the reproduce-or-not information storage means, while if the priority information added to the digital information signal indicates that the digital information signal should not be forcibly displayed, and if the information stored in the reproduce-or-not information storage means indicates that it is necessary to reproduce, the digital information signal should be displayed, in which case if the information stored in the reproduce-or-not information storage means indicates that it is not necessary to reproduce, the digital information signal should be displayed.

3. A transmitter for use in a digital signal transmission system with a receiver, comprising:

a priority information adder to add N-level (N is a positive integer number) priority information to a digital information signal of text, multiplexing means for multiplexing said digital information signal having said priority information added by said priority information adder to each of a plurality of video signals transmitted in said digital signal transmission system, and a transmitting unit to transmit at least one of said plurality of video signals multiplexed with said digital information signal having said priority information added by said priority information adder to said receiver; and wherein said priority information includes forced display information ordering forced display for information whereby the text of the information is forcibly displayed on the receiver independently of any settings applied in the receiver for discriminating the priority information.

4. A receiver for use in a digital signal transmission system with a transmitter transmitting at least one video signal having a multiplexed digital information signal with added priority information, comprising:

demultiplexing means for separating said one video signal from said digital information signal with added priority information;

discriminating means for determining whether said digital information signal is to be reproduced on the basis of previously fixed selection conditions for said priority information added to said separated digital information signal; and first reproducing means for reproducing said digital video signal separated by said demultiplexing means into an image and displaying said image, wherein, when said added priority information includes forced display information, the text of the information is forcibly displayed on the receiver independently of said previously fixed selection conditions.

* * * * *